United States Patent [19]

Pringle

[11] Patent Number: 4,768,539

[45] Date of Patent: Sep. 6, 1988

[54] PIPELINE SAFETY VALVE

[75] Inventor: Ronald E. Pringle, Houston, Tex.

[73] Assignee: Camco, Incorporated, Houston, Tex.

[21] Appl. No.: 98,444

[22] Filed: Sep. 18, 1987

[51] Int. Cl.$^4$ ............................................. F16K 17/14
[52] U.S. Cl. ..................................... 137/70; 137/458;
137/461; 137/463; 137/466; 166/323
[58] Field of Search ...................... 251/58, 73; 137/70,
137/71, 458, 461, 463; 166/323, 332

[56] References Cited

U.S. PATENT DOCUMENTS

| 3,749,119 | 7/1973 | Tausch et al. | 137/461 |
|---|---|---|---|
| 3,860,066 | 1/1975 | Pearce et al. | 137/458 |
| 3,987,849 | 10/1976 | Mott | 137/458 |
| 4,161,980 | 7/1979 | Watkins | 137/458 |
| 4,527,630 | 7/1985 | Pringle | 166/321 |
| 4,574,889 | 3/1986 | Pringle | 166/386 |
| 4,577,654 | 3/1986 | Pringle | 137/219 |

Primary Examiner—A. Michael Chambers
Attorney, Agent, or Firm—Fulbright & Jaworski

[57] ABSTRACT

A surface pipeline safety valve having a tubular member telescopically movable in the housing for controlling the movement of a valve closure member, a rod piston and cylinder assembly contacting and moving the tubular member in response to pressure in the bore of the housing in which the second side of the assembly is in communication with the atmosphere. High and low pressure responsive mechanisms for closing the valve. Seals in the assembly and high and low pressure responsive mechanisms are replaceable from the exterior of the housing.

10 Claims, 13 Drawing Sheets

1

PIPELINE SAFETY VALVE

BACKGROUND OF THE INVENTION

It is known to use a surface pipeline safety valve having a tubular member telesopically movable in the housing for controlling movement of the valve in response to pressure in the pipeline. Such a valve includes high and low pressure pilot valves for closing the safety valve.

The present invention is directed to an improved pipeline safety valve which is quick acting, in which the various seals are enclosed within the valve housing for protection, but the seals can be repaired and replaced while the valve is in the pipeline, the valve can be locked in the open position, it can be closed manually, and does not require external power for reactivation.

SUMMARY

The present invention is directed to a surface pipeline safety valve for controlling fluid flow through a surface pipeline and includes a housing having a bore and a valve closure member in the bore moving between open and closed positions for controlling fluid flow through the bore. A tubular member is telescopically movable in the housing for controlling the movement of the valve closure member and biasing means is provided for moving the tubular member in a direction to close the valve. A rod piston and cylinder assembly having seal means is positioned in the housing contacting and moving the tubular member. A fluid control passageway is positioned in the housing in communication with one side of the assembly and in communication with the bore for opening the first valve member in response to pressure in the bore. The second side of the assembly is in communication with the atmosphere externally of the housing. High and low pressure responsive means are positioned in the housing for closing the valve. The high and low pressure responsive means and the seal means are replaceable from the exterior of the housing while the housing is positioned in the pipeline.

Another object of the present invention is wherein the piston and cylinder assembly includes a first opening piston and a second closing piston. The first piston is exposed on one side to the bore and on the second side to the atmosphere and the second piston is exposed on one side to the bore and on the second side to the fluid control passageway.

Still a further object of the present invention is wherein the second piston includes a labyrinth nonelastomer seal for fail-safe closing.

Yet a still further object of the present invention is the provision of an equalizing valve in the housing for equalizing the pressure in an equalizing line across the valve closure member in which the equalizing valve is externally actuatable and replaceable through an opening in the housing.

Yet a still further object of the present invention is wherein the equalizing valve includes a valve element with two different cross-sectional areas arranged so that the equalizing valve may be opened manually without being subjected to damaging high pressure forces.

A still further object of the present invention is wherein the low pressure responsive means is a pilot valve which is actuated in response to low pressure in the bore and the high pressure responsive means is a high pressure rupture disc which ruptures at a predetermined high bore pressure and actuates the pilot valve.

Still a further object of the present invention is wherein the high pressure responsive means includes releasable engaging means between the tubular member and the piston and cylinder assembly actuated by movement of the tubular member in response to a predetermined high pressure in the bore and yieldable urging means acting to prevent release of the engaging means.

Still a further object of the present invention is the provision of lockout means engagable with the second side of the assembly from the outside of the housing for holding the valve in the open position. In one form the lockout means is engagable between the piston and the housing.

Yet a still further object of the present invention is the provision of a manual actuation means connected to the exterior of the housing and to the low pressure responsive means for closing the valve.

Other and further objects, features and advantages will be apparent from the following description of presently preferred embodiments of the invention, given for the purpose of disclosure and taken in conjunction with the accompanying drawings.

DESCRIPTION OF THE PREFERRED EMBODIMENT

Figure 1A:
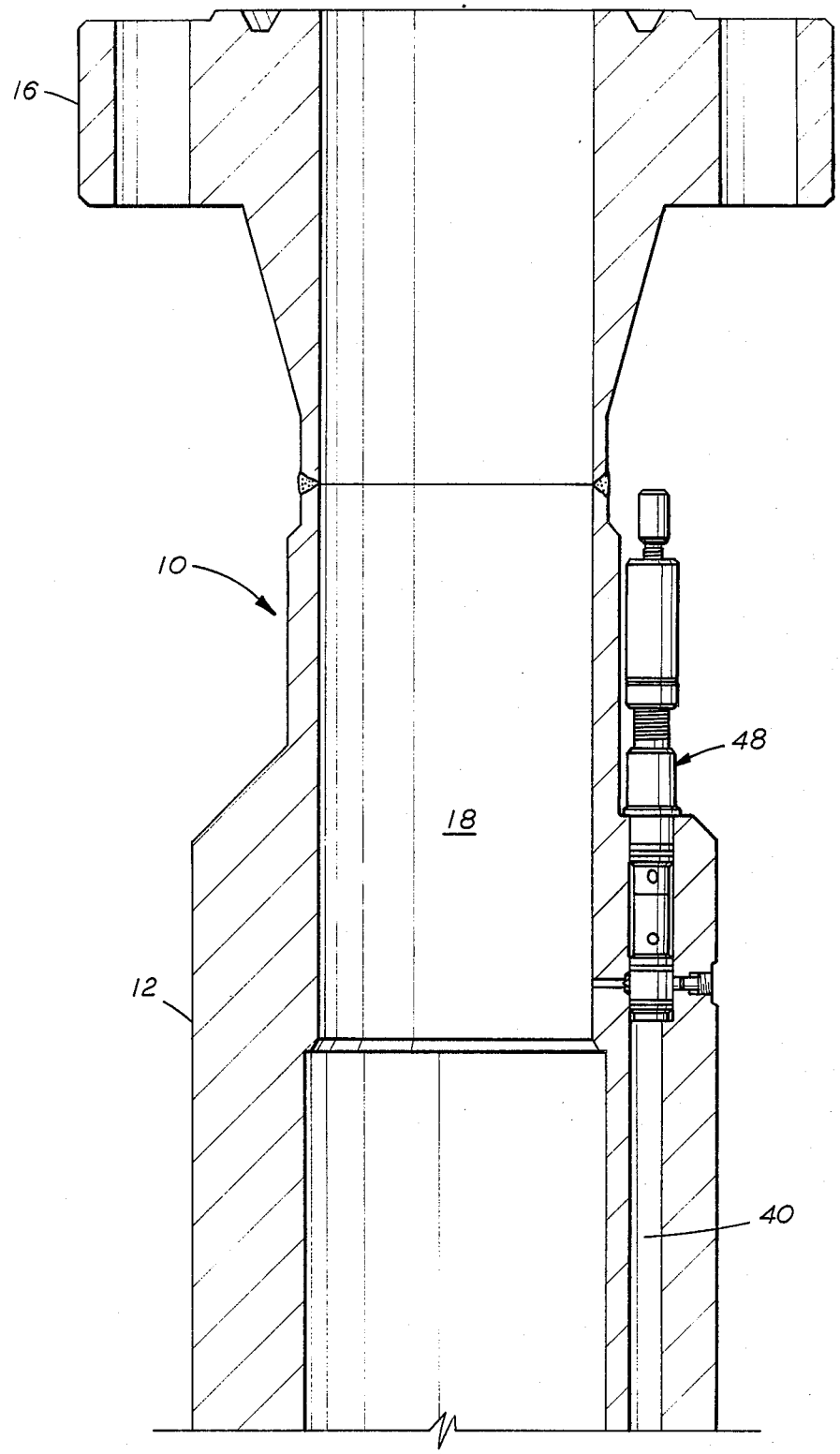
FIGS. 1A, 1B, and 1C are continuations of each other and are an elevational view, in cross section, of one embodiment of the present invention.
Figure 1B:
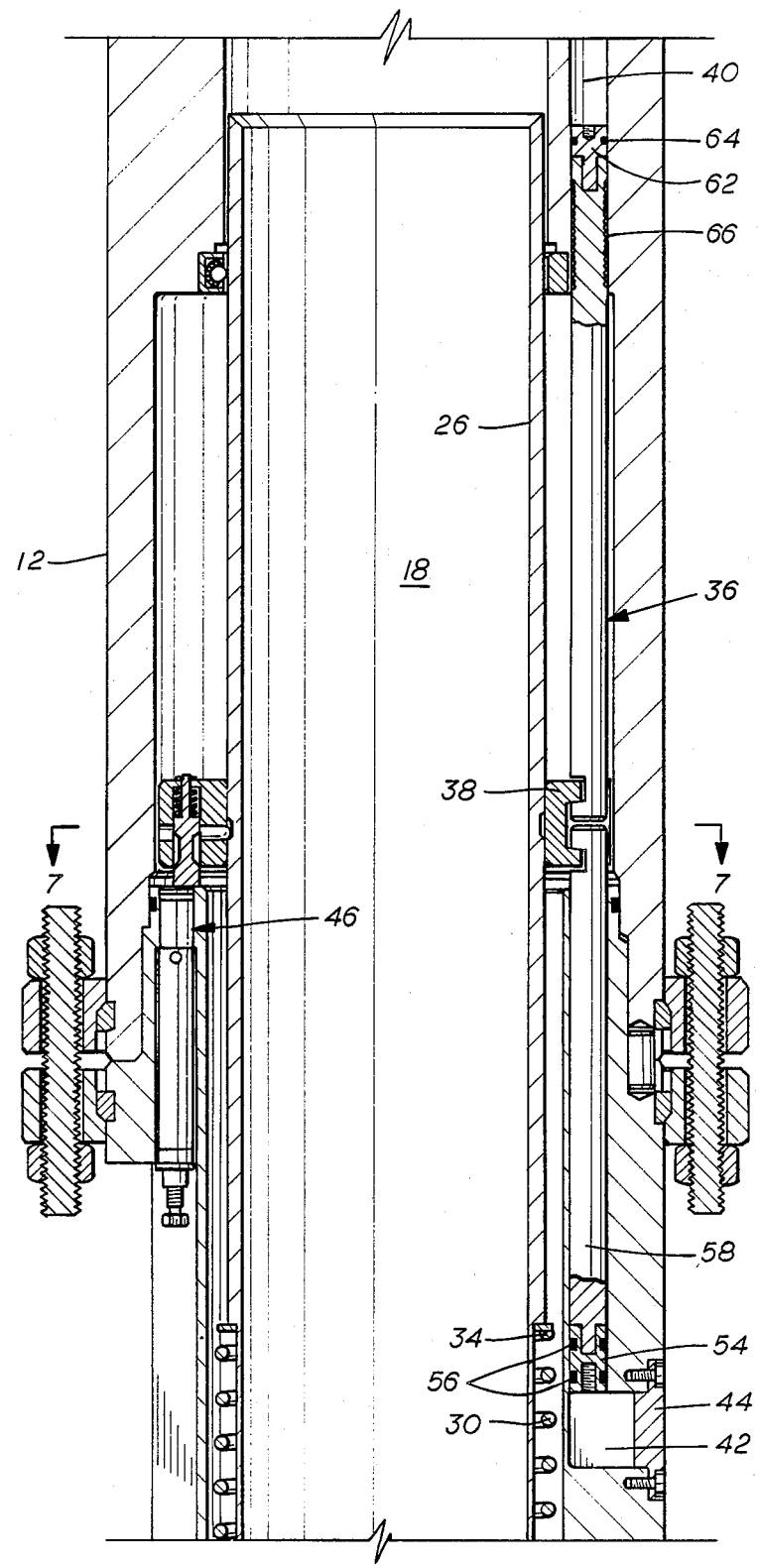
Figure 1C:
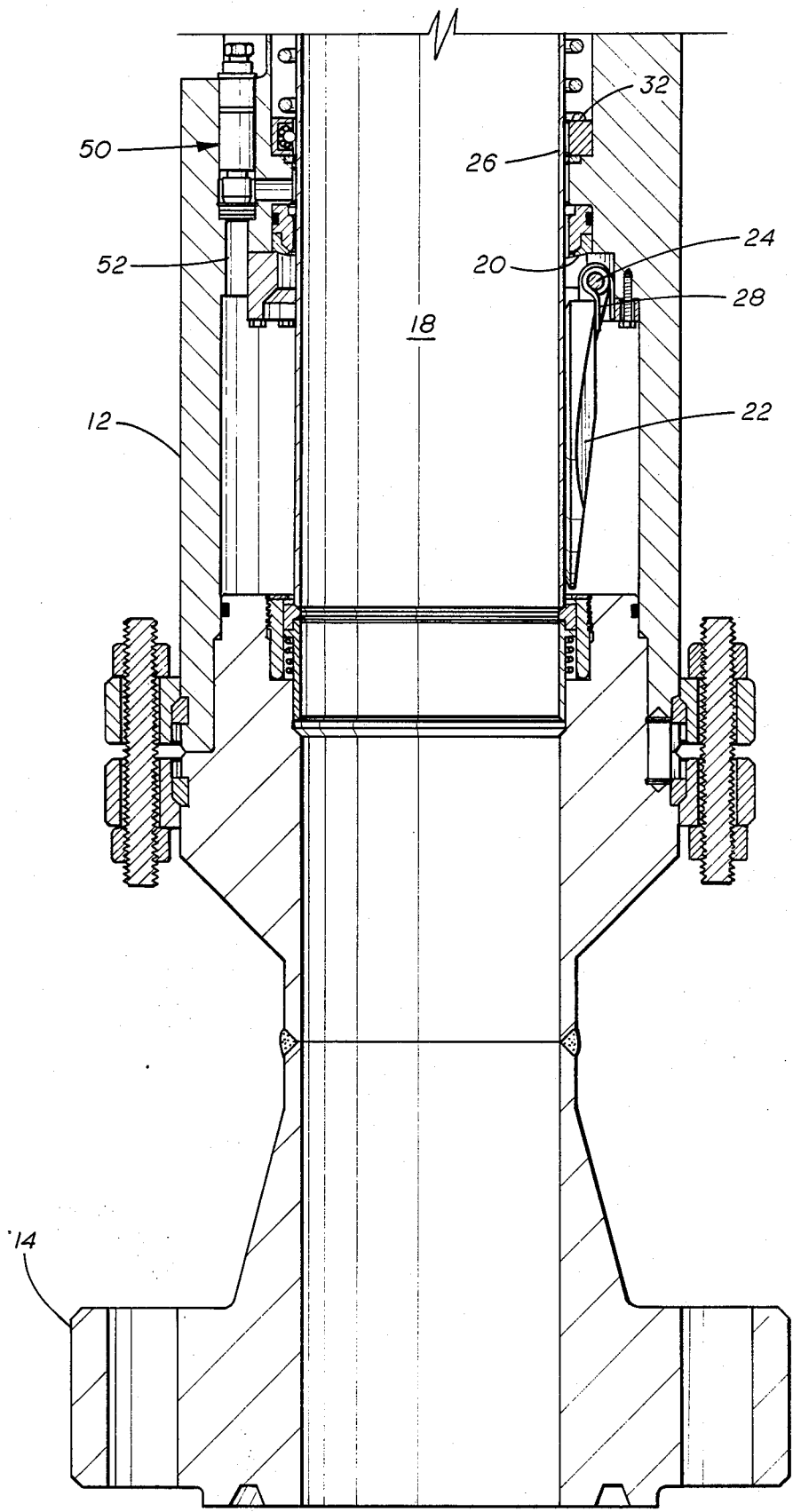

Referring now to the drawings, and particularly to FIGS. 1A, 1B and 1C, the reference numeral 10 generally indicates a surface pipeline safety valve of the present invention which includes a body or housing 12 which is adapted to be connected in a pipeline to permit fluid flow therethrough under normal operating conditions, but in which the safety valve 10 closes in response to a predetermined high or low pressure in the pipeline. The housing 10 may include suitable means for connection in a pipeline such as a pipeline flange 14 (FIG. 1C) at a first upstream end and a flange 16 (FIG. 1A) at a second downstream end.

The valve 10 includes a bore 18, an annular valve seat 20 (FIG. 1C), and a valve closure element such as a flapper valve 22 connected to the body 12 by a pivot pin 24. Thus when the flapper valve 22 is seated on the valve seat 20, the safety valve is closed blocking flow from the upstream flange 14 to the downstream flange 16 through the bore 18. As best seen in FIGS. 1B and 1C, a longitudinal tubular member 26 is telescopically movable in the body 12 and through the valve seat 20. When the tubular member 26 is moved through the valve seat 20 the member 26 pushes the flapper 22 away from the valve seat 20. Thus the valve 10 is held in the open position so long as the member 26 is extended through the valve seat 20. When the member 26 is retracted away from the flapper 22 and valve seat 20, the flapper 22 is allowed to move on to the seat 20 by the action of a spring 28 and also by the action of fluid flow moving through the bore 18 behind the flapper 22.

Biasing means such as a spring 30 is provided between a shoulder 32 on the housing 12 and a shoulder 34 on the tubular member 26 for moving the tubular member 26 in a direction to close the valve 10.

Referring now to FIG. 1B, a rod piston and cylinder assembly generally indicated by the reference numeral 36 is provided in the housing 12 which is connected to a circular yoke 38 which in turn engages and moves the tubular member 26. A fluid control passageway 40 is in communication with one side of the piston and cylinder assembly and is in communication with the bore 18, as will be more fully described hereinafter, for opening the valve member 22 in response to pressure in the bore 18. The second side of the assembly 36 is in communication with the atmosphere through a cavity 42 which may be closed by a nonsealing cover 44.

A high pressure responsive means generally indicated by the reference numeral 46 (FIG. 1B) is provided in the housing for closing the valve 10 in response to a predetermined high pressure in the bore 18. A low pressure responsive means 48 (FIG. 1A) is provided in the housing for closing the valve 10 in response to a predetermined low pressure in the bore 18. A pressure equalizing valve generally indicated by the reference numeral 50 (FIG. 1C) is provided in an equalizing line 52 extending from a point connected to the bore 18 below the seat 20 to a point in the bore 18 above the seat 20 for equalizing across the valve closure member 22 when the valve is closed for equalizing pressure prior to reopening the valve member element 22.

Figure 5:
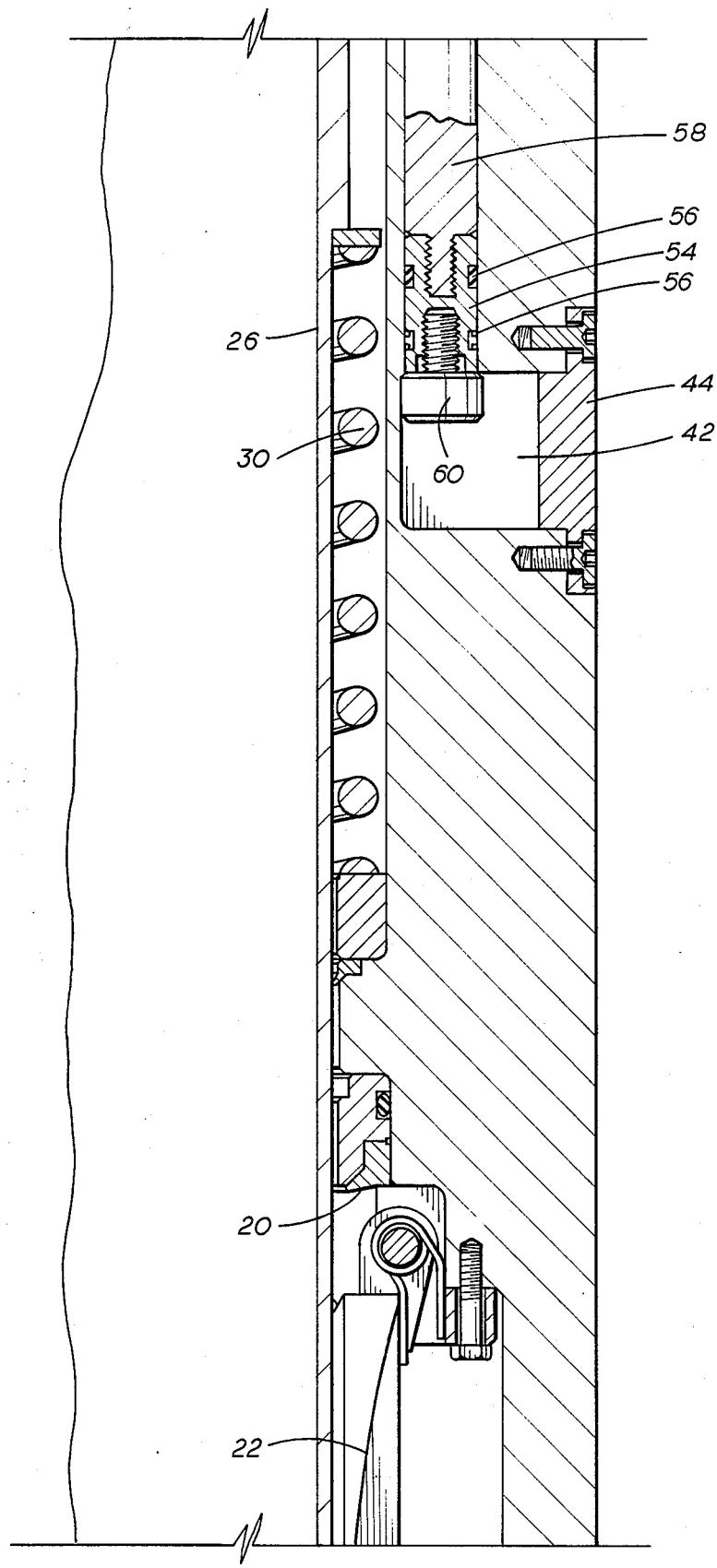
FIG. 5 is an enlarged fragmentary elevational view of the lockout mechanism of the present invention for locking the valve in the open position.

Referring again to FIG. 1B and 5, the rod piston and cylinder assembly 36 preferably includes a first opening piston 54 having piston seals 56 and is threadably connected to a piston rod 58. The first or opening piston 54 is exposed on one side to fluid pressure in the bore 18 as the fluid pressure in the bore 18 may be transmitted around the outside of the tubular member 22 and against one side of the piston 54. The second side of the piston 54 is exposed to the atmosphere by being in communication with the cavity 42. It is to be noted that the first piston 54 may be repaired or replaced while the valve 10 is in place in a pipeline by removing the cover 44 and unscrewing the piston 54 from the piston rod 58. As shown in FIG. 5, lockout means such as a bolt 58 may be screwed into the piston 54 and engage the housing 12 for holding the valve 10 in the locked out open position which is desirable to allow tools to be pumped through the pipeline such as cleanout pigs. However, in normal operation, the lockout bolt 60 is disconnected from the piston 54 through the cavity 42.

The piston and cylinder assembly 36 includes a second closing piston 62 (FIG. 1B) which is exposed on one side to the pressure in the bore 18 which is the same pressure to which one side of the first piston 54 is exposed. The piston 62 is exposed on the second side to the fluid control passageway 40. The piston 62 includes seal means 64 which may be resilient seal means, but preferably includes a labyrinth seal 66 which may be a plurality of grooves and ridges for insuring a fail-safe closing of the valve 10 in the event of the failure of the seal means 64. Therefore, since the piston and cylinder assembly 36 is subject to a balanced force by the pressure in the bore 18 acting against one side of both the pistons 54 and 62 and with the second side of the piston 54 being exposed to the atmosphere, the piston and cylinder assembly 36 may be moved to the open position by the application of fluid pressure in the fluid passageway 40 which is greater than atmosphere and sufficient to overcome the biasing spring 30. If the fluid pressure in the fluid passageway 40 is reduced to atmospheric pressure, then the piston and cylinder assembly 36 is balanced and the biasing spring 30 can move the tubular member 26 to the closed position.

Figure 2:
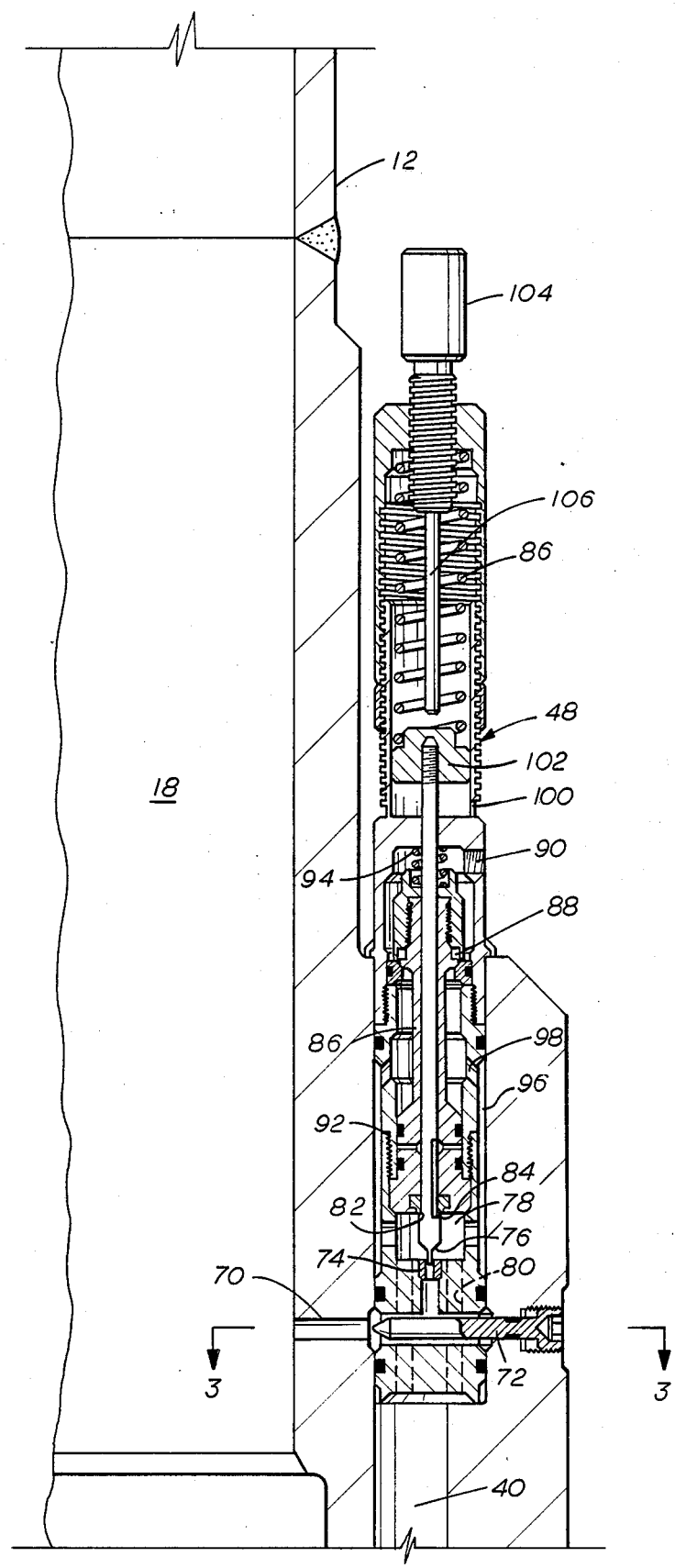
FIG. 2 is an enlarged fragmentary elevational view of the low pressure responsive means of FIG. 1A for controlling the valve.
Figure 3:
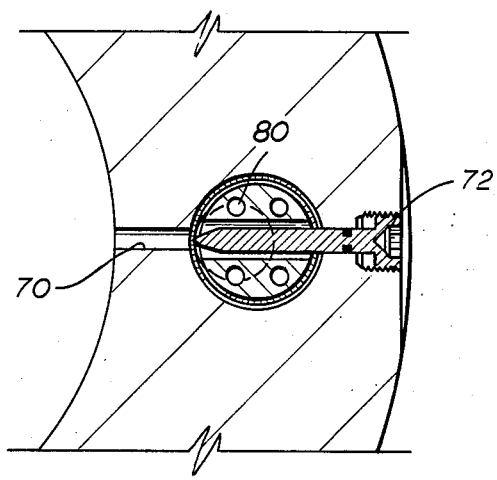
FIG. 3 is a cross-sectional view taken along the line 3—3 of FIG. 2.

Referring now to FIGS. 2 and 3, the operation of the low pressure responsive means 48 is best seen which has the function of dumping or reducing the pressure in the fluid control passageway 40 to atmospheric pressure in the event that the pressure in the bore 18 is reduced to a predetermined low pressure. The pressure responsive means 48 is shown in position with the safety valve 10 opened. In this position, fluid pressure in the bore 18 flows through a passageway 70 which is controlled by a pipeline pressure shutoff valve 72, which may be a needle valve, which is shown in the open position. Passageway 70 is in communication with a shutoff port 74 which is controlled by a valve element 76 shown in the open position whereby pipeline pressure flows into a chamber 78 and through openings 80 which are in communication with the fluid control passageway 40 thereby applying pipeline pressure to the piston and cylinder assembly 36 holding the valve 10 in the open position. The low pressure responsive means 48 includes a pilot operated valve which includes a pilot seat 82 shown closed by the pilot valve element 84. The pilot valve element 84 is biased to an open position by an adjustable spring 86 but is shown in the closed position as the pressure in the chamber 78 overcomes the force of the spring 86. A two seal dump piston 86 includes a main seal 88 shown closed and blocking communication with a dump port 90. A second larger seal 92 is provided on the dump piston 86 and the dump piston is biased by a spring 94 in a direction to close the main valve seat 88. Pressure in the chamber 78 flows through grooves 96 and into ports 98 to act in opposite directions on the seals 88 and 92. However, since the diameter of seal 92 is larger than the diameter of the seal 88 the main or dump seal 88 is kept closed.

However, when the pressure in the pipeline bore 18 reaches a predetermined low pressure, the pressure in the chamber 78 reaches the same pressure and therefore the closing force on the pilot valve element 84 is reduced below the opening force of the spring 86 which trips the pilot valve to cause the element 76 to seat and close the port 74. At the same time the pressure in chamber 78 flows through the pilot valve seat 82 equalizing the pressure across the piston seal 92 thereby allowing the main valve seat 88 to open and bleed the pressure from the chamber 78 and the flow control passage 40 through the dump port 90. This reduces the pressure on the one side of the piston 62 to atmospheric, thereby balancing the pressure forces on the piston and cylinder assembly 36 allowing the valve 10 to close by the action of spring 30.

When it is desired to reset the low pressure responsive means 48, the pipeline pressure shutoff valve 72 is closed and the pressure across the valve closure member 22 is equalized. The pilot valve element 84 is manually placed back on its seat 82 by inserting a screw driver through a window 100 to move head 102 upwardly to move the pilot valve element 82 to the closed position. The shutoff valve 72 is reopened thereby allowing the pipeline pressure to hold the pilot seat closed. Thus, the pilot valve is reset and pipeline pressure again flows through the openings 80 and into the fluid control passageway 40 to reopen the safety valve 10.

A manual actuator 104 is provided which can be activated in order to close the safety valve. First, the shutoff valve 72 is closed and then the manual actuator 104 is rotated to bring its stem 106 into contact with the head 102 to move the pilot valve 84 off of its seat to dump the pressure behind the closing piston 62 to atmosphere thereby closing the safety valve. To reopen the safety valve 10, the manual actuator 102 is retracted by reverse rotation and the pilot valve is reset as before.

Figure 7:
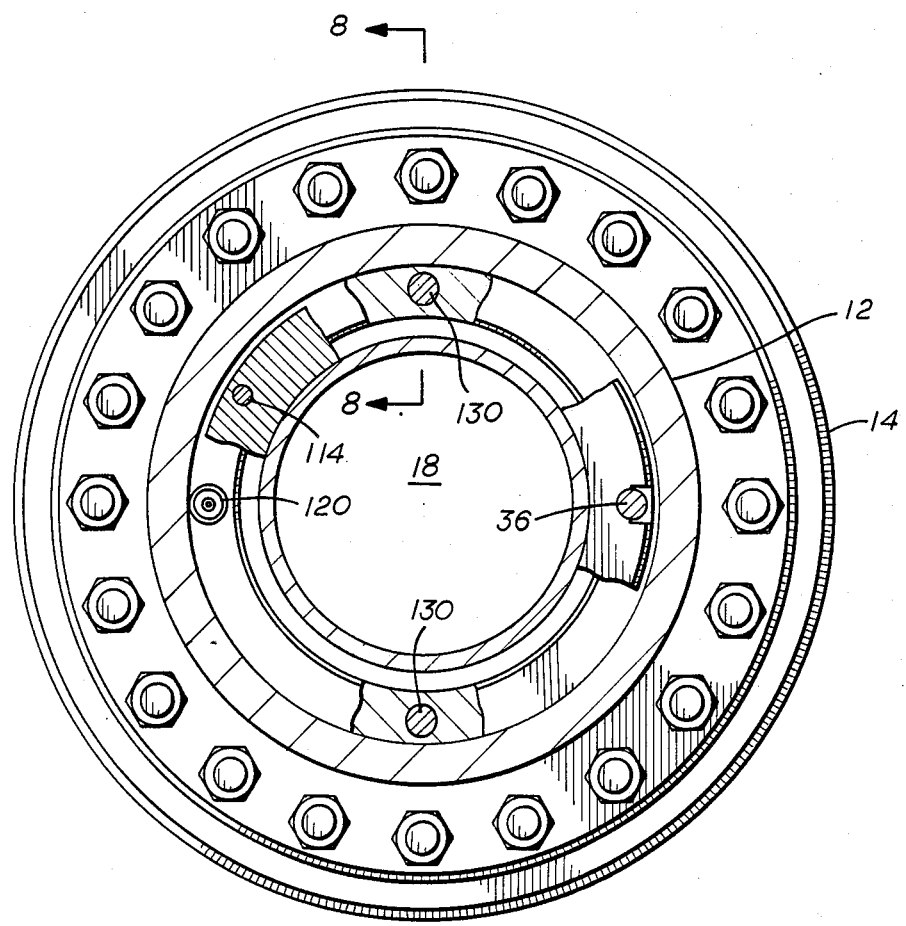
FIG. 7 is a cross-sectional view taken along the line 7—7 of FIG. 1B.
Figure 4:
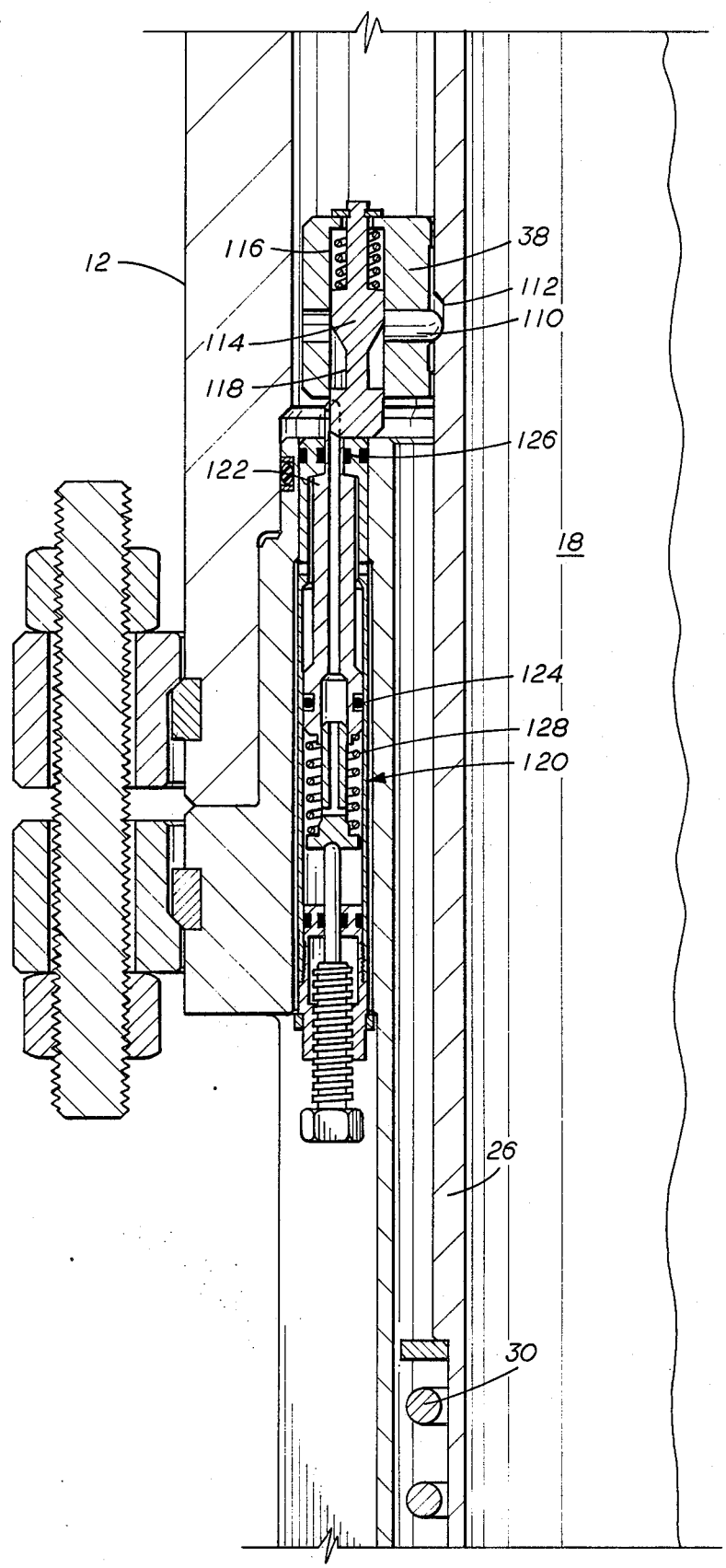
FIG. 4 is an enlarged fragmentary elevational view of the high pressure responsive means of FIG. 1B for closing the valve in response to high pressure.
Figure 8:
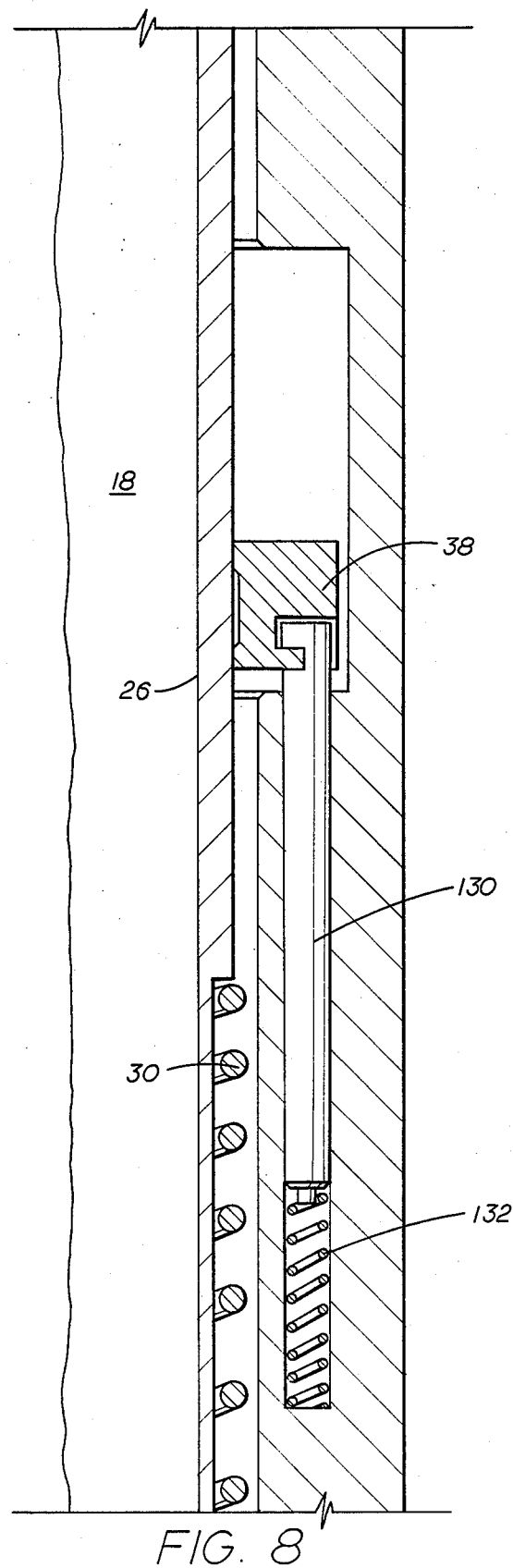
FIG. 8 is a cross-sectional view taken along the line 8—8 of FIG. 7, FIGS. 9A, 9B, and 9C are continuations of each other and are an elevational view, in cross section, of the preferred embodiment of the present invention.

The high pressure responsive means for closing the safety valve 10 in response to high pressure in the bore 18 is shown in greater detail in FIGS. 4, 7 and 8. Referring to FIG. 4, the piston yoke 38 is normally connected to the tubular member 26 by a release pin 110 which engages a groove 112 in the tubular member 26. The pin 110 is normally held in the groove 112 by a release plunger 114 by a spring 116. The parts shown in FIG. 4 are shown with the valve 10 in the open position. Upon increase of the pressure in the bore 18, the tubular member 26 moves downwardly allowing the release plunger 114 to engage the housing 12 and move upwardly relative to the pin 110 to allow the pin 110 to retract into a recess 118 in the plunger 114 thereby releasing the tubular member 26 from the yoke 38 and the piston and cylinder assembly 36 causing the bias spring 30 to retract the tubular member 26 and close the flapper valve 22.

In order to accurately set the predetermined pressure at which the high pressure responsive means 46 is actuated, a pressure compensated plunger generally indicated by the reference numeral 120 is provided which is rotationally offset from the release plunger 114, as best seen in FIG. 7, which includes a hollow prong 122 in fluid communication with the bore 18, positioned to engage the underside of the piston yoke 38 and resist downward movement of the yoke 38 and thus the release plunger 114 until the force of the prong 122 is overcome. High pressure fluid from the bore 18 is transmitted behind the tubular member 26 and enters the hollow prong 122 and flows behind behind a seal 124 which has a larger diameter than seal 126 about the exterior of the prong 122 to provide a fluid force resisting downward movement of the yoke 38. In addition, an adjustable spring 128 acts on the prong 122 for adjusting the force of the plunger 120. The fluid compensation of the pipeline pressure 18 acting in combination with the spring 128 reduces the force required by the spring 128. Therefore, before the release plunger 114 can be actuated, the predetermined high pressure in the bore 18 must overcome the force exerted by the prong 122 against the yoke 38.

In order to reset the safety valve and relatch the tubular member 26 to the pin 110 after a high pressure closure, the low pressure responsive means 48 is actuated to vent the pressure at the top of the piston and cylinder assembly 36. As best seen in FIGS. 7 and 8 guide rods 130 which are connected to the yoke 38 now move the yoke 38 upwardly by means of a spring 132 to reposition the release plunger 114 and reconnect the pin 110 in the groove 112.

Figure 6:
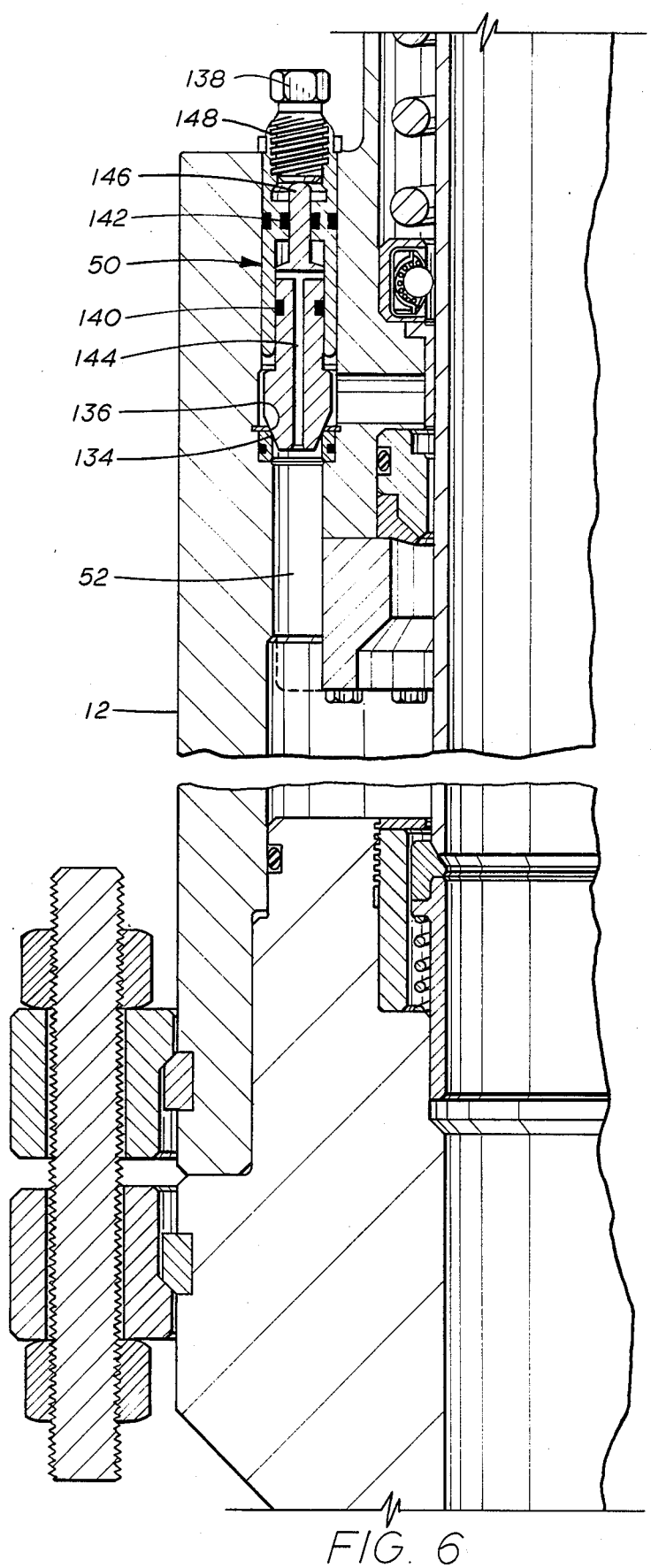
FIG. 6 is an enlarged fragmentary elevational view showing the equalizing valve of FIG. 1C.

Referring now to FIGS. 1C and 6, the operation of the equalizing valve 50 is best seen which includes a valve element 134 adapted to seat on a seat 136 and which is actuated by a threaded actuator 136 for opening and closing the equalizing line 52. The valve element 34 includes two different cross-sectional sealing areas sealed by a first larger seal 140 and a second smaller diameter seal 142. The larger sealing area 140 is exposed on both sides to the pressure in the equalizing line 52 by a passageway 144. This allows a reduction in the size of the stem 146 and thus the force acting upon the threads 148 to prevent them from being galled.

It is to be noted that the various seals in the safety valve 10 can be repaired and replaced from the exterior of the housing 12 while the valve 10 is in position in the pipeline. Referring to FIG. 6, the entire equalizing valve 50 may be removed and replaced when needed. Referring to FIGS. 1A and 2, the low pressure responsive means 48 can be removed, repaired and replaced, and at the same time the upper piston 62 in FIG. 1B can be replaced. The lower piston 54 can be repaired and replaced through the cavity 42.

Figure 9A:
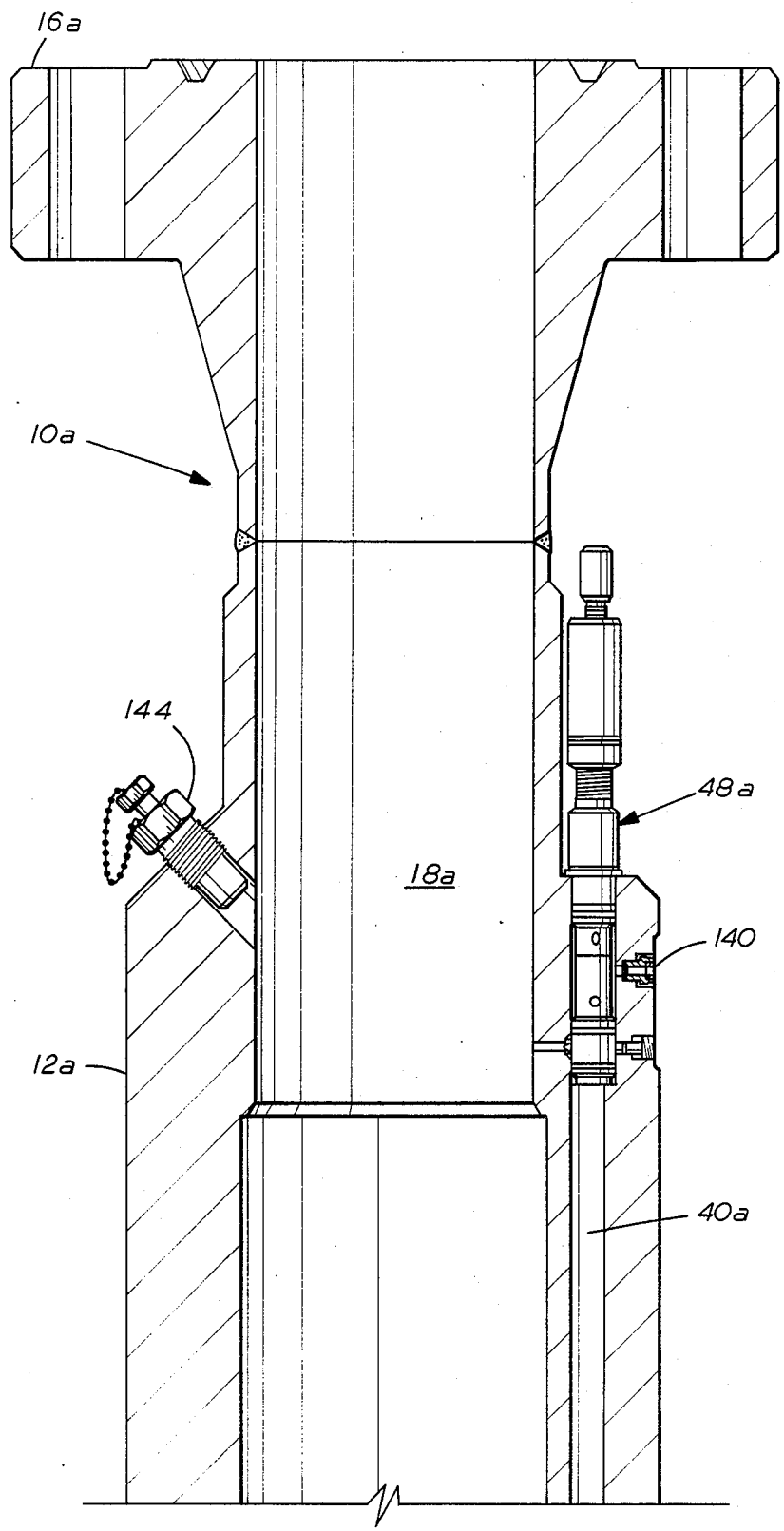
Figure 9B:
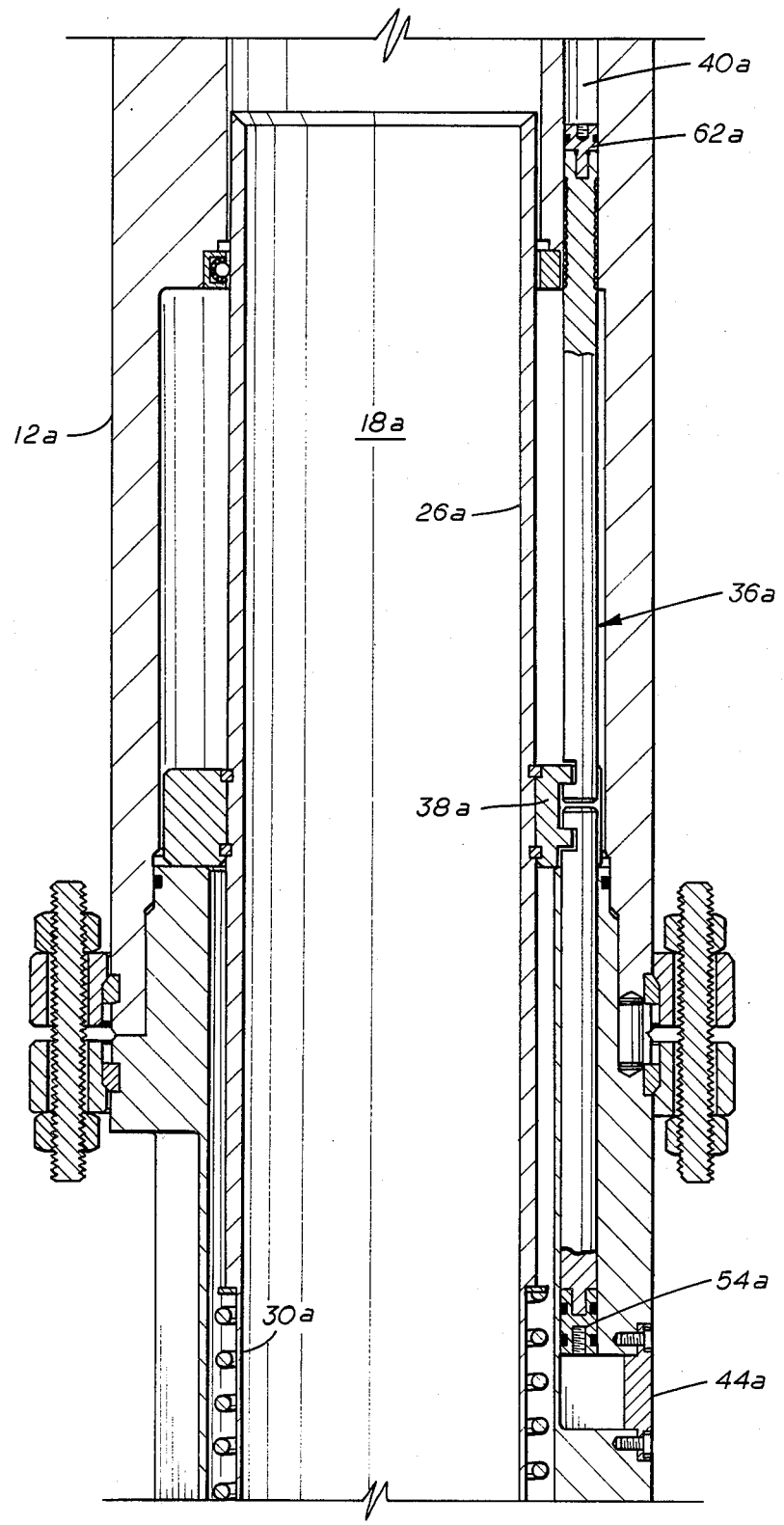
Figure 9C:
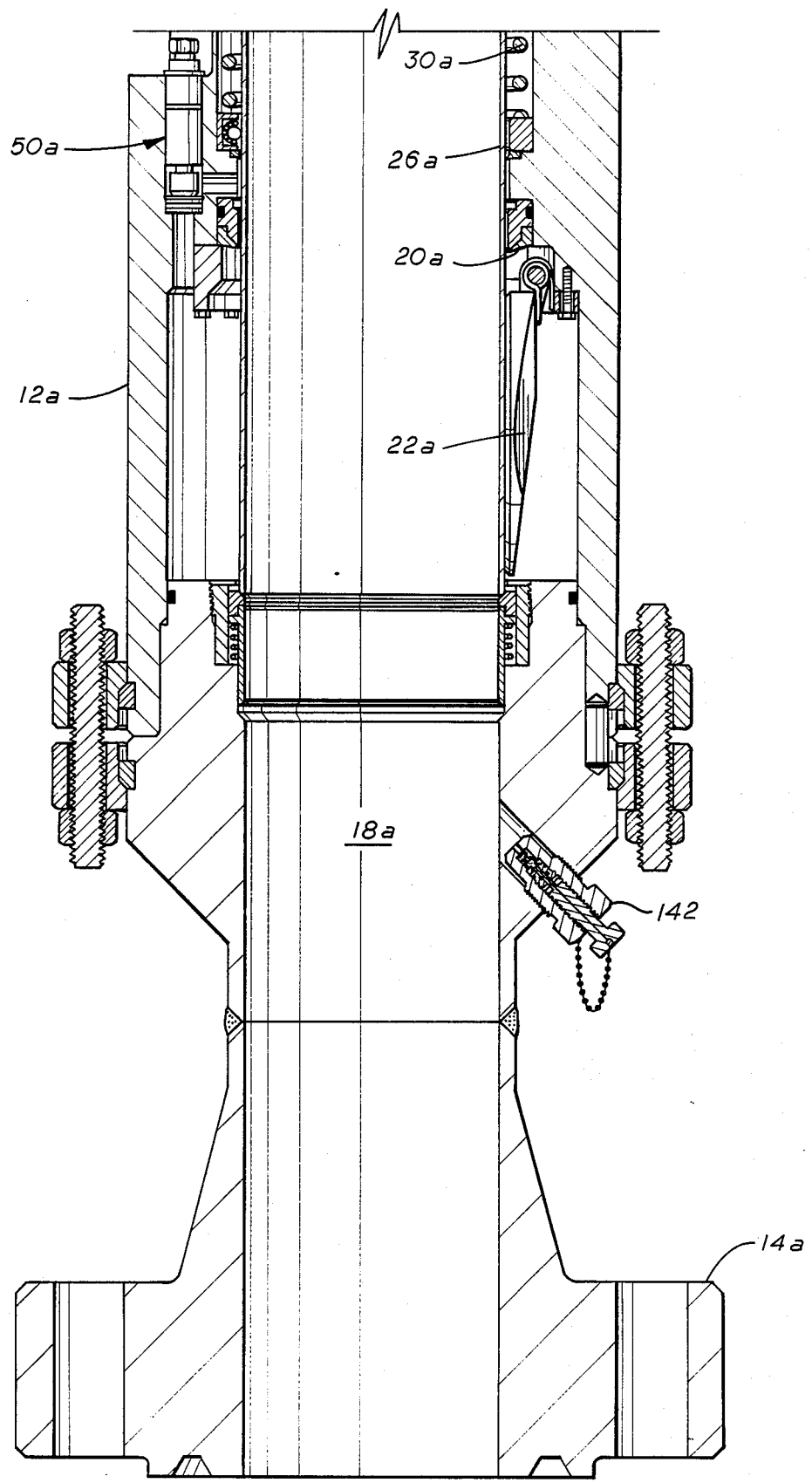
Figure 10:
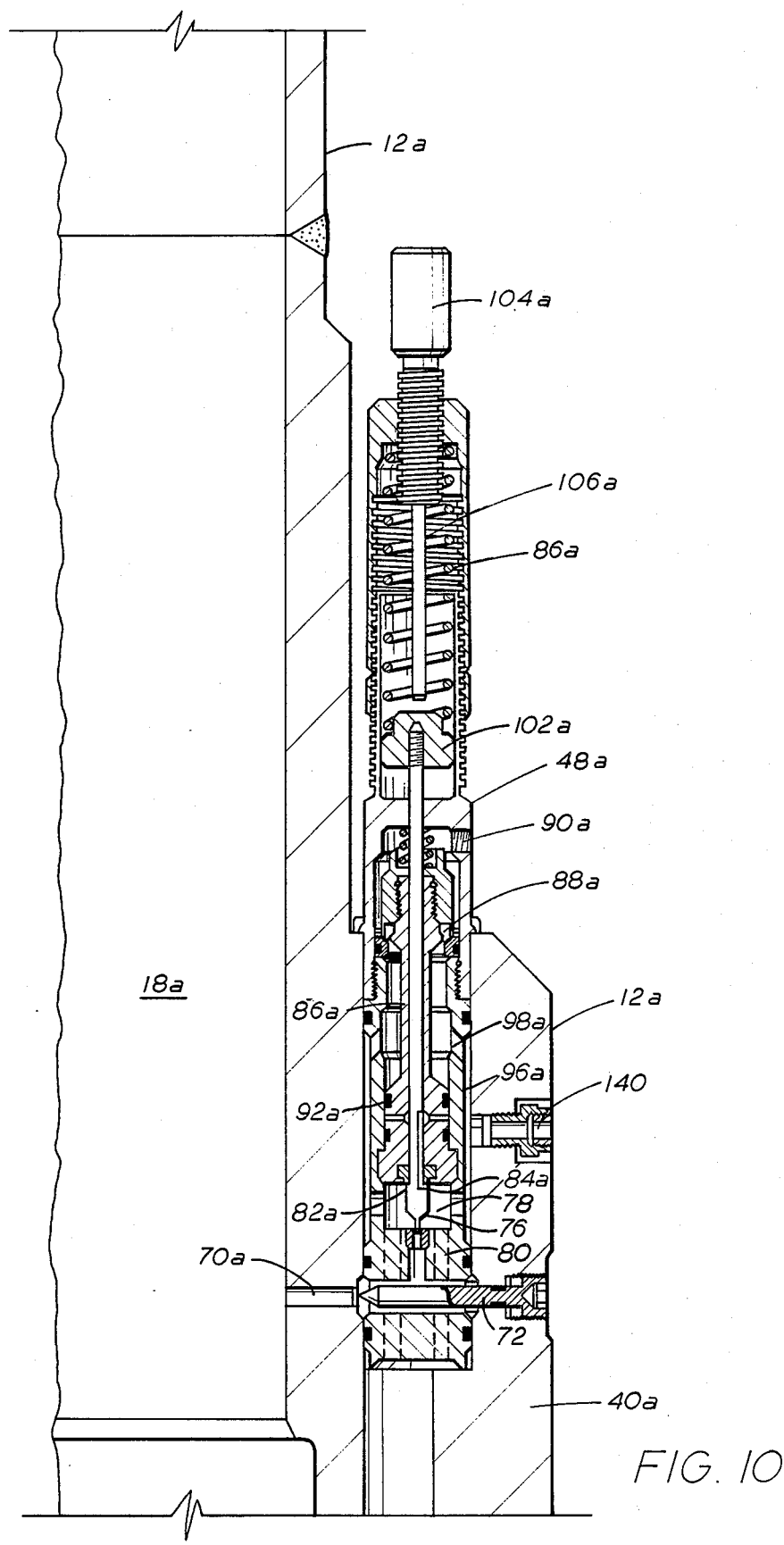
FIG. 10 is an enlarged fragmentary elevational view of the combined low and high pressure responsive means of FIG. 9A for closing the safety valve upon the occurrence of either a high or low pressure.

Another and further embodiment of the present invention is disclosed in FIGS. 9A, 9B, 9C and 10, wherein like parts to those disclosed in FIGS. 1 through 8 are similarly numbered with the addition of the suffix "a". The embodiment 10a of the safety valve is generally similar to valve 10 with the exception that the high pressure responsive means 46 is omitted and replaced with a high pressure responsive means 140. As best seen in FIGS. 9A and 10, the high pressure responsive means 140 is a high pressure rupture disc screwed into the housing 12a and is in communication with the pilot valve. The high pressure rupture disc 140 ruptures at a predetermined high pressure and creates a reduced pressure in the pilot section of the pilot valve to activate the low pressure pilot valve which closes the valve closure member 22. That is, the disc 140 may be in communication with the groove 96a and thus in communication with the chamber 78a. When the disc 140 ruptures to atmosphere, it quickly dumps the pressure in chambers 78a allowing the pilot valve element 84a to be opened by the spring 86a to dump the pressure from the fluid control passageway 48 causing the safety valve 10a to close.

In addition, the valve 10a includes an upstream flow line pressure gauge connection 142 (FIG. 9C) and a downstream flow line pressure gauge connection 144 (FIG. 9A) for adding pressure gauges for measuring pressure. These connections may also be added to the embodiments of FIGS. 1 through 8, if desired.

The embodiment of valve 10a is the preferred embodiment as it provides a simpler structure with fewer parts and only requires that the rupture disc 140 be replaced after it is ruptured. The pressure disc 140 may be set for any suitable rupture pressure and is generally accurate within a plus or minus two percent.

The valve 10a is shown in FIGS. 9A, 9B, 9C in the operating and open position. In the event that the pressure in the bore 18a falls to a predetermined low, the low pressure responsive means 48a will operate similarly to the means 48 in FIG. 2 as previously described. Again, if the predetermined high pressure is encountered in the bore 18a it will pass through the passageway 70a in FIG. 10 to the chamber 78a and rupture the disc 140 which then causes the valve 48a to be activated to bleed the pressure from the control passageway 40a and close the valve.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. A surface pipeline safety valve for controlling fluid through a surface pipeline comprising,
    a housing having a bore and a valve closure member in the bore moving between open and closed positions for controlling fluid flow through the bore,
    a tubular member telescopically movable in the housing for controlling the movement of the valve closure member,
    biasing means for moving the tubular member in a direction to close the valve,
    a rod piston and cylinder assembly having seal means and positioned in the housing contacting and moving the tubular member, wherein the piston and cylinder assembly includes,
    a first opening piston connected to a second closing piston,
    said first piston exposed on one side to the bore and on the second side to the atmosphere,
    said second piston being exposed on one side to the bore and on the second side to the fluid control passageway,
    a fluid control passageway positioned in the housing in communication with one side of the assembly and in communication with the bore for opening the valve member in response to pressure in the bore,
    said second side of the assembly being in communication with the atmosphere externally of the housing,
    high and low pressure responsive means positioned in the housing for closing said valve in response to a predetermined high or low pressure in the bore, and
    said high and low pressure responsive means and said seal means being replaceable through the housing while the housing is positioned in a pipeline.

2. The apparatus of claim 1 wherein the second piston includes a labyrinth nonelastomer seal for fail-safe closing.

3. The apparatus of claim 1 including an equalizing valve in the housing for equalizing the pressure in an equalizing line across the first valve closure member, said equalizing valve being externally actuable and replaceable through an opening in the housing.

4. The apparatus of claim 3 wherein the equalizing valve includes,
    a valve element, said element including two different cross-sectional sealing areas,
    said larger cross-sectional area being exposed on both sides of its sealing area to the pressure in the equalizing line,
    said smaller cross-sectional sealing area exposed on one side to the pressure in the equalizing line and on the other side to the atmosphere, and
    actuating means extending from the outside to the inside of the housing and engaging the smaller cross-sectional sealing area.

5. The apparatus of claim 1 wherein the low pressure responsive means is a pilot valve which is actuated in response to low pressure in the bore, and
    the high pressure responsive means is a high pressure rupture disc which ruptures at a predetermined high bore pressure and actuates the pilot valve.

6. The apparatus of claim 1 wherein high pressure responsive means includes,
    releasable engaging means between the tubular member and the piston and cylinder assembly actuated by movement of the tubular member in response to predetermined high pressure in the bore, and
    yieldably urging means acting to prevent release of the engaging means.

7. The apparatus of claim 6 wherein the yieldable urging includes fluid compensation means and spring means.

8. The apparatus of claim 1 including,
    lockout means engagable with the second side of the assembly from the outside of the housing for holding the valve in the open position.

9. The apparatus of claim 8 wherein said lockout means is engagable between the piston and housing.

10. The apparatus of claim 1 including,
    manual actuation means connected to the exterior of the housing and to the low pressure response means for closing the valve.

* * * * *

UNITED STATES PATENT OFFICE
CERTIFICATE OF CORRECTION

Patent No. 4,768,539   Dated September 6, 1988

Inventor(s) Ronald E. Pringle

It is certified that error appears in the above-identified patent and that said Letters Patent are hereby corrected as shown below:

Column 7, line 7, after "18a" insert -- , --

Column 7, line 8, change "waY" to -- way --

Column 7, in claim 1, first line, after "fluid" insert -- flow --

Signed and Sealed this

Thirty-first Day of January, 1989

Attest:

DONALD J. QUIGG

Attesting Officer   Commissioner of Patents and Trademarks